United States Patent
Ueda et al.

(10) Patent No.: US 11,167,761 B2
(45) Date of Patent: Nov. 9, 2021

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Yugo Ueda, Wako (JP); Akihiro Toda, Wako (JP); Dan Umeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 271 days.

(21) Appl. No.: 16/233,222

(22) Filed: Dec. 27, 2018

(65) Prior Publication Data
US 2019/0225219 A1 Jul. 25, 2019

(30) Foreign Application Priority Data
Jan. 19, 2018 (JP) .............................. JP2018-007661

(51) Int. Cl.
*B60W 30/165* (2020.01)
*B60W 10/20* (2006.01)
(Continued)

(52) U.S. Cl.
CPC .......... *B60W 30/165* (2013.01); *B60W 10/20* (2013.01); *B60W 30/18154* (2013.01); *G06K 9/00791* (2013.01)

(58) Field of Classification Search
CPC ... G06K 9/00791; G06K 9/00; B60W 30/165; B60W 30/18154; B60W 10/20; B60W 30/00; B60W 30/14; B60W 2550/00; B60W 2550/30; B60W 2550/306; B60W 2520/00; B60W 2520/06; B60W 2520/04; B60W 50/0097; B60W 30/10; B60W 30/12; B60W 30/143; B60W 30/16; B60W 30/162; B60W 30/18; B60W 30/18009; B60K 2310/00; B60K 2310/26; B60K 2310/262; B60K 2310/28; B60K 2310/268; B60K 2310/266; B60K 31/00; B60K 31/0008;
(Continued)

(56) References Cited

FOREIGN PATENT DOCUMENTS

| JP | 2000-020896 | 1/2000 |
| JP | 2009-001245 | 1/2009 |
| JP | 2010-072772 | 4/2010 |

OTHER PUBLICATIONS

Japanese Office Action for Japanese Patent Application No. 2018-007661 dated Aug. 20, 2019.

*Primary Examiner* — Anthony R Jimenez
(74) *Attorney, Agent, or Firm* — Amin, Turocy & Watson, LLP

(57) ABSTRACT

A vehicle control device (100) includes a recognizer (130) that recognizes a situation occurring near an own-vehicle, and a driving controller (140, 160) that controls acceleration/deceleration and steering of the own-vehicle on the basis of a result of the recognition of the recognizer. When performing travel control according to a behavior of a preceding vehicle that is traveling in front of the own-vehicle such that the own-vehicle follows the preceding vehicle to pass through an intersection, the driving controller does not perform following of the preceding vehicle if a turning start point of the preceding vehicle does not match a turning start point in a route predicted for the own-vehicle to pass through the intersection in a scheduled direction or if a turning angle of the preceding vehicle does not match a turning angle in the predicted route.

12 Claims, 8 Drawing Sheets

(51) Int. Cl.
*G06K 9/00* (2006.01)
*B60W 30/18* (2012.01)

(58) Field of Classification Search
CPC ............ B60K 31/0016; B60K 31/0025; B60K 31/0033; B60K 41/00; G08G 1/00
USPC .......................................................... 701/41
See application file for complete search history.

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-007661, filed Jan. 19, 2018, the content of which is incorporated herein by reference.

BACKGROUND OF THE INVENTION

Field of the Invention

The present invention relates to a vehicle control device, a vehicle control method, and a storage medium.

Description of Related Art

An invention of an apparatus for supporting driving of a vehicle in which a current vehicle speed maintenance mode for maintaining the current vehicle speed of an own-vehicle, an acceleration mode for accelerating the own-vehicle to a target speed, and a deceleration mode for decelerating the own-vehicle to a target speed are preset, an intersection is regarded as an acceleration suppressing section, one of the modes is selected according to the distance from the position of the own-vehicle to start and end points of the acceleration suppressing section, and the travel of the vehicle is controlled such that the vehicle speed thereof becomes that of the selected mode is disclosed in the related art (see Japanese Unexamined Patent Application, First Publication No. 2010-072772).

At present, it is not easy for an automatically driven vehicle to control turning right or left at an intersection. Especially at an intersection of an irregular shape which is not a cross or T shape or an intersection where there are many pedestrians, bicycles, or the like, it may be difficult to generate a target trajectory for passing through the intersection by sensing. In technologies of the related art, sufficient studies for smoothly passing through an intersection have not been performed.

SUMMARY OF THE INVENTION

Aspects of the present invention have been made in view of such circumstances and it is an object of the present invention to provide a vehicle control device, a vehicle control method, and a storage medium that allow an own-vehicle to pass through an intersection more smoothly.

A vehicle control device, a vehicle control method, and a storage medium according to the present invention adopt the following configurations.

(1) A vehicle control device according to an aspect of the present invention includes a recognizer configured to recognize a situation occurring near an own-vehicle, and a driving controller configured to control acceleration/deceleration and steering of the own-vehicle on the basis of a result of the recognition of the recognizer, wherein the driving controller is configured not to, when performing travel control according to a behavior of a preceding vehicle that is traveling in front of the own-vehicle such that the own-vehicle follows the preceding vehicle to pass through an intersection, perform following of the preceding vehicle if a turning start point of the preceding vehicle does not match a turning start point in a route predicted for the own-vehicle to pass through the intersection in a scheduled direction or if a turning angle of the preceding vehicle does not match a turning angle in the predicted route.

(2) In the vehicle control device according to the above aspect (1), the driving controller is configured to, when not performing following of the preceding vehicle, perform travel control for passing through the intersection on the basis of the result of the recognition of the recognizer.

(3) In the vehicle control device according to the above aspect (2), the driving controller is configured to, when not performing following of the preceding vehicle, perform travel control for passing through the intersection on the basis of the result of the recognition of the recognizer after causing the own-vehicle to wait at a predetermined vehicle speed or less until a blind spot due to the preceding vehicle is reduced.

(4) In the vehicle control device according to the above aspect (1), the driving controller is configured to, before passing through a specific intersection, increase an inter-vehicle distance from a preceding vehicle that is traveling in front of the own-vehicle.

(5) A vehicle control method according to another aspect of the present invention includes a computer recognizing a situation occurring near an own-vehicle, and controlling acceleration/deceleration and steering of the own-vehicle on the basis of a result of the recognition, wherein when performing travel control according to a behavior of a preceding vehicle that is traveling in front of the own-vehicle such that the own-vehicle follows the preceding vehicle to pass through an intersection, the computer does not perform following of the preceding vehicle if a turning start point of the preceding vehicle does not match a turning start point in a route predicted for the own-vehicle to pass through the intersection in a scheduled direction or if a turning angle of the preceding vehicle does not match a turning angle in the predicted route.

(6) A storage medium according to another aspect of the present invention is a computer readable non-transitory storage medium storing a program causing a computer to recognize a situation occurring near an own-vehicle, and to control acceleration/deceleration and steering of the own-vehicle on the basis of a result of the recognition, wherein when performing travel control according to a behavior of a preceding vehicle that is traveling in front of the own-vehicle such that the own-vehicle follows the preceding vehicle to pass through an intersection, the computer does not perform following of the preceding vehicle if a turning start point of the preceding vehicle does not match a turning start point in a route predicted for the own-vehicle to pass through the intersection in a scheduled direction or if a turning angle of the preceding vehicle does not match a turning angle in the predicted route.

According to the above aspects (1) to (6), it is possible to allow the own-vehicle to pass through the intersection more smoothly.

According to the above aspects (3) and (4), the target trajectory can be maintained with high accuracy even when the own-vehicle passes through the intersection by itself.

DETAILED DESCRIPTION OF THE INVENTION

Hereinafter, embodiments of a vehicle control device, a vehicle control method, and a storage medium of the present invention will be described with reference to the drawings. The following description will be given with reference to the case in which left-hand traffic laws are applied, but the terms "left" and "right" simply need to be read in reverse when right-hand traffic laws are applied.

[Overall Configuration]

Figure 1:
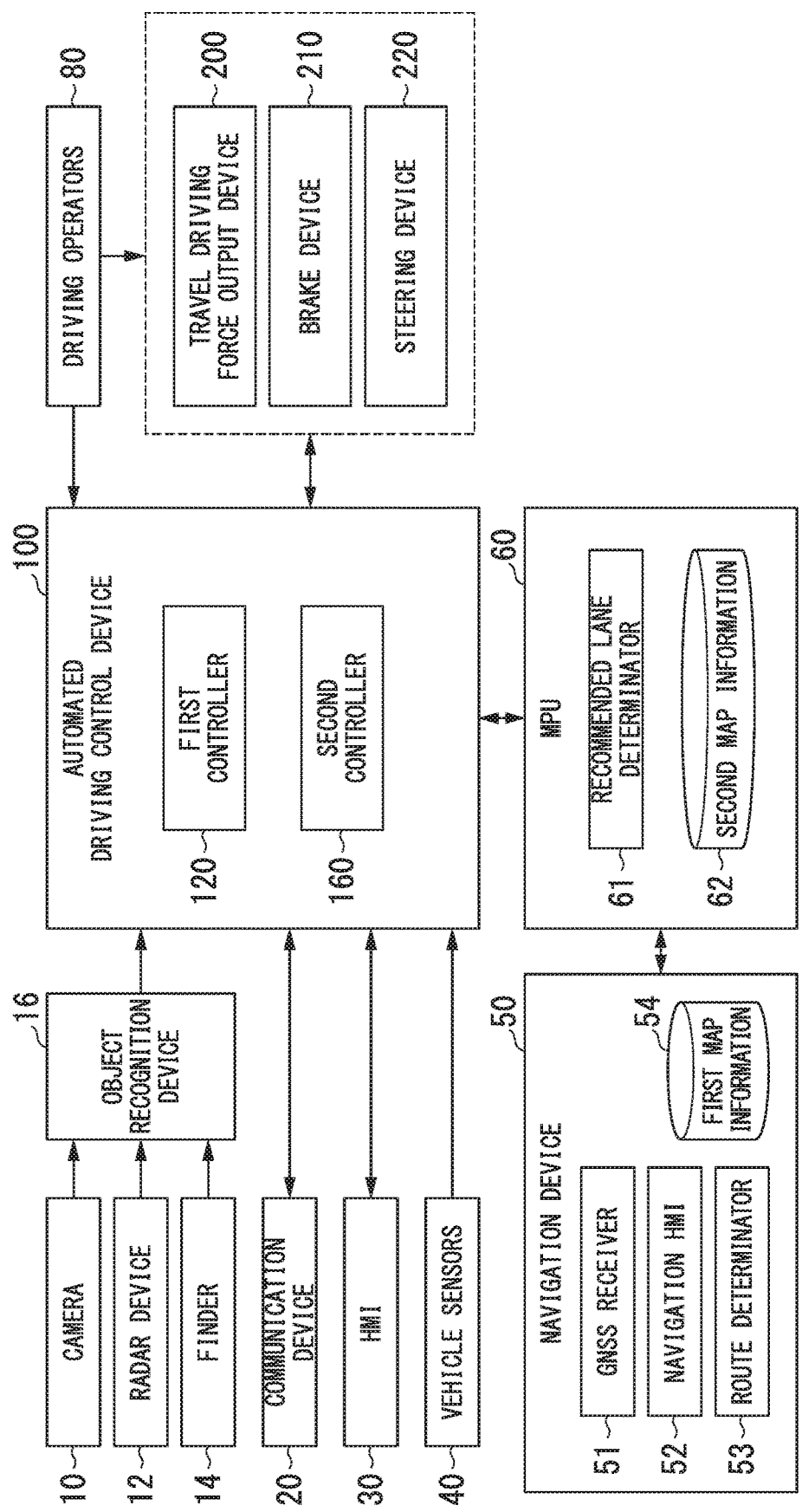
FIG. 1 is a configuration diagram of a vehicle system using a vehicle control device according to an embodiment.

FIG. 1 is a configuration diagram of a vehicle system 1 using a vehicle control device according to a first embodiment. A vehicle in which the vehicle system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine or using discharge power of a secondary battery or a fuel cell.

The vehicle system 1 includes, for example, a camera 10, a radar device 12, a finder 14, an object recognition device 16, a communication device 20, a human machine interface (HMI) 30, vehicle sensors 40, a navigation device 50, a map positioning unit (MPU) 60, driving operators 80, an automated driving control device 100, a travel driving force output device 200, a brake device 210, and a steering device 220. These devices or apparatuses are connected to each other by a multiplex communication line or a serial communication line such as a controller area network (CAN) communication line, a wireless communication network, or the like. The components shown in FIG. 1 are merely an example and some of the components may be omitted or other components may be added.

The camera 10 is, for example, a digital camera using a solid-state imaging device such as a charge coupled device (CCD) or complementary metal oxide semiconductor (CMOS) image sensor. The camera 10 is attached to the vehicle in which the vehicle system 1 is mounted (hereinafter referred to as an own-vehicle M) at an arbitrary location. For imaging the area in front of the vehicle, the camera 10 is attached to an upper portion of a front windshield, a rear surface of a rearview mirror, or the like. For example, the camera 10 repeats imaging of the surroundings of the own-vehicle M at regular intervals. The camera 10 may also be a stereo camera.

The radar device 12 radiates radio waves such as millimeter waves around the own-vehicle M and detects radio waves reflected by an object (reflected waves) to detect at least the position (distance and orientation) of the object. The radar device 12 is attached to the own-vehicle M at an arbitrary location. The radar device 12 may detect the position and velocity of an object using a frequency modulated continuous wave (FM-CW) method.

The finder 14 is a light detection and ranging (LIDAR) finder. The finder 14 illuminates the surroundings of the own-vehicle M with light and measures scattered light. The finder 14 detects the distance to a target on the basis of a period of time from when light is emitted to when light is received. The light radiated is, for example, pulsed laser light. The finder 14 is attached to the own-vehicle M at an arbitrary location.

The object recognition device 16 performs a sensor fusion process on results of detection by some or all of the camera 10, the radar device 12, and the finder 14 to recognize the position, type, speed, or the like of the object. The object recognition device 16 outputs the recognition result to the automated driving control device 100. The object recognition device 16 may output detection results of the camera 10, the radar device 12 and the finder 14 to the automated driving control device 100 as they are. The object recognition device 16 may be omitted from the vehicle system 1.

For example, the communication device 20 communicates with other vehicles near the own-vehicle M using a cellular network, a Wi-Fi network, Bluetooth (registered trademark), dedicated short range communication (DSRC) or the like or communicates with various server devices via wireless base stations.

The HMI 30 presents various types of information to an occupant in the own-vehicle M and receives an input operation from the occupant. The HMI 30 includes various display devices, a speaker, a buzzer, a touch panel, switches, keys, or the like.

The vehicle sensors 40 include a vehicle speed sensor that detects the speed of the own-vehicle M, an acceleration sensor that detects the acceleration thereof, a yaw rate sensor that detects an angular speed thereof about the vertical axis, an orientation sensor that detects the orientation of the own-vehicle M, or the like.

The navigation device 50 includes, for example, a global navigation satellite system (GNSS) receiver 51, a navigation HMI 52, and a route determinator 53. The navigation device 50 holds first map information 54 in a storage device such as a hard disk drive (HDD) or a flash memory. The GNSS receiver 51 specifies the position of the own-vehicle M on the basis of signals received from GNSS satellites. The position of the own-vehicle M may also be specified or supplemented by an inertial navigation system (INS) using the output of the vehicle sensors 40. The navigation HMI 52 includes a display device, a speaker, a touch panel, a key, or the like. The navigation HMI 52 may be partly or wholly shared with the HMI 30 described above. For example, the route determinator 53 determines a route from the position of the own-vehicle M specified by the GNSS receiver 51 (or an arbitrary input position) to a destination input by the occupant (hereinafter referred to as an on-map route) using the navigation HMI 52 by referring to the first map information 54. The first map information 54 is, for example, information representing shapes of roads by links indicating roads and nodes connected by the links. The first map information 54 may include curvatures of roads, point of interest (POI) information, or the like. The on-map route is output to the MPU 60. The navigation device 50 may also perform route guidance using the navigation HMI 52 on the basis of the on-map route. The navigation device 50 may be realized, for example, by a function of a terminal device such as a smartphone or a tablet possessed by the occupant. The navigation device 50 may also transmit the current position and the destination to a navigation server via the communication device 20 and acquire a route equivalent to the on-map route from the navigation server.

The MPU 60 includes, for example, a recommended lane determinator 61 and holds second map information 62 in a storage device such as an HDD or a flash memory. The recommended lane determinator 61 divides the on-map route provided from the navigation device 50 into a plurality of blocks (for example, into blocks each 100 meters long in the direction in which the vehicle travels) and determines a recommended lane for each block by referring to the second map information 62. The recommended lane determinator 61 determines the recommended lane such that it is given a position in a lane order counted from the leftmost lane. When there is a branch point on the on-map route, the recommended lane determinator 61 determines a recommended lane such that the own-vehicle M can travel on a reasonable route for proceeding to the branch destination.

The second map information 62 is map information with higher accuracy than the first map information 54. The second map information 62 includes, for example, information of the centers of lanes or information of the boundaries of lanes. The second map information 62 may also include road information, traffic regulation information, address information (addresses/postal codes), facility information, telephone number information, or the like. The second map information 62 may be updated as needed by the communication device 20 communicating with another device.

The driving operators 80 include, for example, an accelerator pedal, a brake pedal, a shift lever, a steering wheel, a different shaped steering member, a joystick, and other operators. Sensors for detecting the amounts of operation or the presence or absence of operation are attached to the driving operators 80. Results of the detection are output to the automated driving control device 100 or some or all of the travel driving force output device 200, the brake device 210, and the steering device 220.

The automated driving control device 100 includes, for example, a first controller 120 and a second controller 160. Each of the first controller 120 and the second controller 160 is realized, for example, by a hardware processor such as a central processing unit (CPU) executing a program (software). Some or all of these components may be realized by hardware (including circuitry) such as large scale integration (LSI), an application specific integrated circuit (ASIC), a field-programmable gate array (FPGA), or a graphics processing unit (GPU) or may be realized by hardware and software in cooperation. The program may be stored in a storage device such as an HDD or a flash memory in the automated driving control device 100 in advance or may be stored in a detachable storage medium such as a DVD or a CD-ROM and then installed in the HDD or flash memory in the automated driving control device 100 by inserting the storage medium into a drive device.

Figure 2:
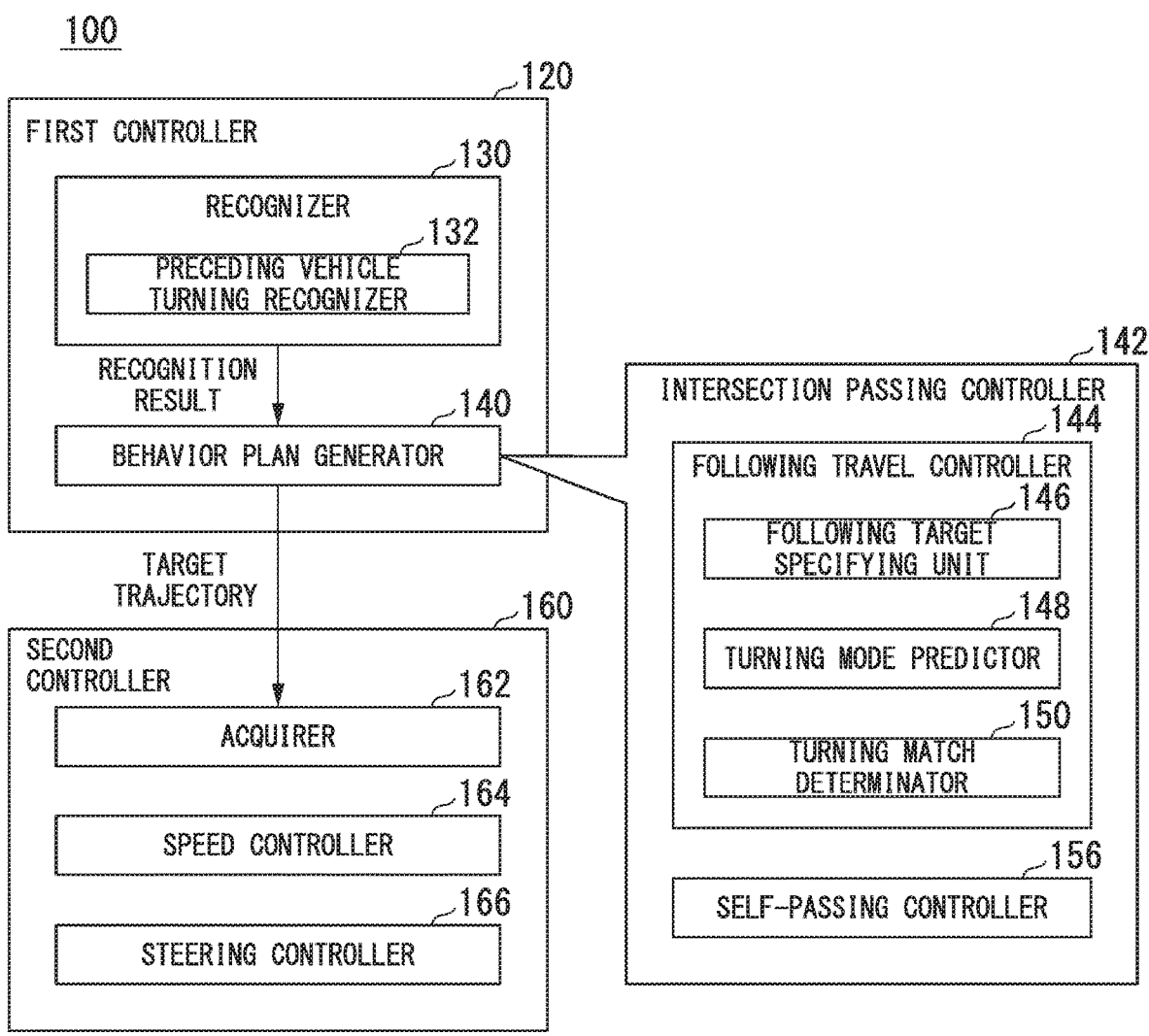
FIG. 2 is a functional configuration diagram of a first controller and a second controller.

FIG. 2 is a functional configuration diagram of the first controller 120 and the second controller 160. The first controller 120 includes, for example, a recognizer 130 and a behavior plan generator 140. For example, the first controller 120 realizes a function based on artificial intelligence (AI) and a function based on a previously given model in parallel. For example, the function of "recognizing an intersection" is realized by performing recognition of an intersection through deep learning or the like and recognition based on previously given conditions (presence of a signal, a road sign, or the like for which pattern matching is possible) in parallel and evaluating both comprehensively through scoring. This guarantees the reliability of automated driving.

The recognizer 130 recognizes states of an object near the own-vehicle M such as the position, speed and acceleration thereof on the basis of information input from the camera 10, the radar device 12, and the finder 14 via the object recognition device 16. The position of the object is recognized, for example, as a position in an absolute coordinate system whose origin is at a representative point on the own-vehicle M (such as the center of gravity or the center of a drive axis thereof), and used for control. The position of the object may be represented by a representative point on the object such as the center of gravity or a corner thereof or may be represented by an expressed region. The "states" of the object may include an acceleration or jerk of the object or a "behavior state" thereof (for example, whether or not the object is changing or is going to change lanes).

The recognizer 130 recognizes, for example, a (traveling) lane in which the own-vehicle M is traveling. For example, the recognizer 130 recognizes the traveling lane, for example, by comparing a pattern of road lane lines (for example, an arrangement of solid and broken lines) obtained from the second map information 62 with a pattern of road lane lines near the own-vehicle M recognized from an image captured by the camera 10. The recognizer 130 may recognize the traveling lane by recognizing travel boundaries (road boundaries) including road lane lines, road shoulders, curbs, a median strip, guard rails, or the like, without being limited to road lane lines. This recognition may be performed taking into consideration a position of the own-vehicle M acquired from the navigation device 50 or a result of processing by the INS. The recognizer 130 recognizes temporary stop lines, obstacles, red lights, toll gates, and other road phenomena.

When recognizing the traveling lane, the recognizer 130 recognizes the position or attitude of the own-vehicle M with respect to the traveling lane. For example, the recognizer 130 may recognize both a deviation from the lane center of the reference point of the own-vehicle M and an angle formed by the travel direction of the own-vehicle M relative to an extension line of the lane center as the relative position and attitude of the own-vehicle M with respect to the traveling lane. Alternatively, the recognizer 130 may recognize the position of the reference point of the own-vehicle M with respect to one of the sides of the traveling lane (a road lane line or a road boundary) or the like as the relative position of the own-vehicle M with respect to the traveling lane.

The recognizer 130 includes, for example, a preceding vehicle turning recognizer 132. This will be described later.

The behavior plan generator 140 generates a target trajectory along which the own-vehicle M will travel in the future automatically (independently of the driver's operation), basically such that the own-vehicle M travels in the recommended lane determined by the recommended lane determinator 61 and copes with situations occurring near the own-vehicle M. The target trajectory includes, for example, a speed element. The target trajectory is expressed, for example, by an arrangement of points (trajectory points) which are to be reached by the own-vehicle M in order. The trajectory points are points to be reached by the own-vehicle M at intervals of a predetermined travel distance (for example, at intervals of about several meters) along the road. Apart from this, a target speed and a target acceleration for each predetermined sampling time (for example, every several tenths of a second) are determined as a part of the target trajectory. The trajectory points may be respective positions at the predetermined sampling times which the own-vehicle M is to reach at the corresponding sampling times. In this case, information on the target speed or the target acceleration is represented with the interval between the trajectory points.

When generating the target trajectory, the behavior plan generator 140 may set an automated driving event. Examples of the automated driving event include a constant-speed travel event, a low-speed following travel event, a lane change event, an intersection passing event, a branching event, a merging event, and a takeover event. The behavior plan generator 140 generates the target trajectory according to an activated event.

The second controller 160 controls the travel driving force output device 200, the brake device 210, and the steering device 220 such that the own-vehicle M passes through the target trajectory generated by the behavior plan generator 140 at scheduled times.

The second controller 160 includes, for example, an acquirer 162, a speed controller 164, and a steering controller 166. The acquirer 162 acquires information on the target trajectory (trajectory points) generated by the behavior plan generator 140 and stores it in a memory (not shown). The speed controller 164 controls the travel driving force output device 200 or the brake device 210 on the basis of the speed element included in the target trajectory stored in the memory. The steering controller 166 controls the steering device 220 according to the degree of curvature of the target trajectory stored in the memory. The processing of the speed controller 164 and the steering controller 166 is realized, for example, by a combination of feedforward control and feedback control. As one example, the steering controller 166 performs the processing by combining feedforward control according to the curvature of the road ahead of the own-vehicle M and feedback control based on deviation from the target trajectory.

The travel driving force output device 200 outputs a travel driving force (torque) required for the vehicle to travel to driving wheels. The travel driving force output device 200 includes, for example, a combination of an internal combustion engine, an electric motor, a transmission, and the like and an ECU that controls them. The ECU controls the above constituent elements according to information input from the second controller 160 or information input from the driving operators 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the second controller 160 or information input from the driving operators 80 such that a brake torque corresponding to a braking operation is output to each wheel. The brake device 210 may include, as a backup, a mechanism for transferring a hydraulic pressure generated by an operation of the brake pedal included in the driving operators 80 to the cylinder via a master cylinder. The brake device 210 is not limited to that configured as described above and may be an electronically controlled hydraulic brake device that controls an actuator according to information input from the second controller 160 and transmits the hydraulic pressure of the master cylinder to the cylinder.

The steering device 220 includes, for example, a steering ECU and an electric motor. The electric motor, for example, applies a force to a rack-and-pinion mechanism to change the direction of steering wheels. The steering ECU drives the electric motor according to information input from the second controller 160 or information input from the driving operators 80 to change the direction of the steering wheels.

[Intersection Passing Control]

Each part of the behavior plan generator 140 will be described below. The behavior plan generator 140 includes, for example, an intersection passing controller 142. The intersection passing controller 142 includes, for example, a following travel controller 144 and a self-passing controller 156. The following travel controller 144 includes, for example, a following target specifying unit 146, a turning mode predictor 148, and a turning match determinator 150.

The intersection passing controller 142 operates when an intersection passing event is activated. Upon passing through an intersection, the intersection passing controller 142 performs control of switching between a following travel mode in which the own-vehicle M follows a preceding vehicle to pass through the intersection and a self-passing mode in which it recognizes the travel destination to pass through the intersection by itself.

Figure 3:
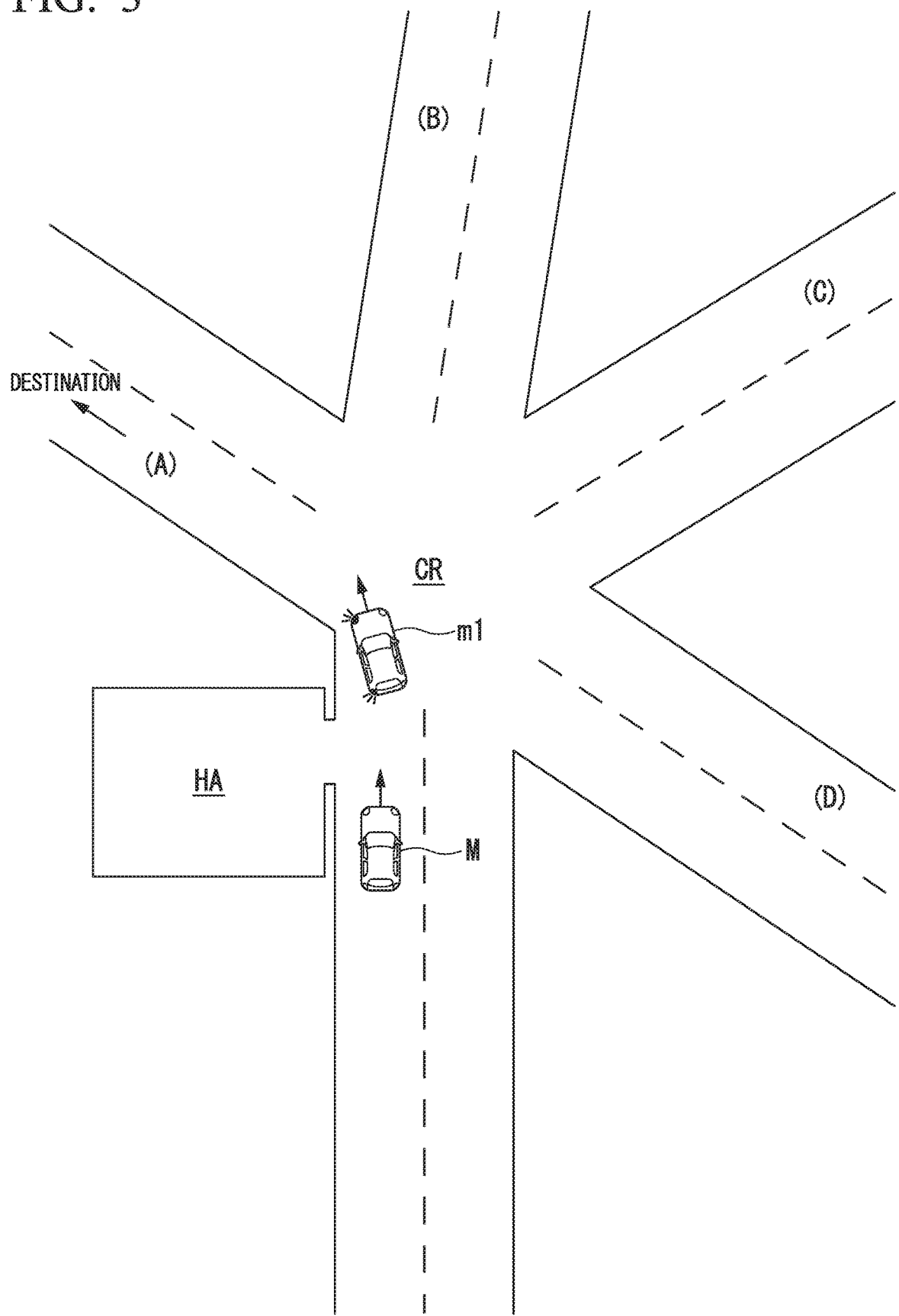
FIG. 3 is a (first) diagram illustrating the function of a following travel controller.

The following travel controller 144 operates when the intersection passing controller 142 has selected the following travel mode. FIG. 3 is a (first) diagram illustrating the function of the following travel controller 144. The own-vehicle M is about to turn left at an intersection CR and to proceed toward a direction (A) according to a recommended route for heading to the destination described above. In this case, for example, when the preceding vehicle turning recognizer 132 has recognized that a preceding vehicle m1 is turning to the left with its left turn signal activated, the following travel controller 144 decides to follow the preceding vehicle m1 to pass through the intersection. The following travel controller 144 generates a target trajectory such that the lateral position of the own-vehicle M matches that of the preceding vehicle m1 while maintaining a predetermined inter-vehicle distance from the preceding vehicle m1. That is, the following travel controller 144 performs travel control according to the behavior of the preceding vehicle m1 to cause the own-vehicle M to travel following the preceding vehicle m1.

Figure 4:
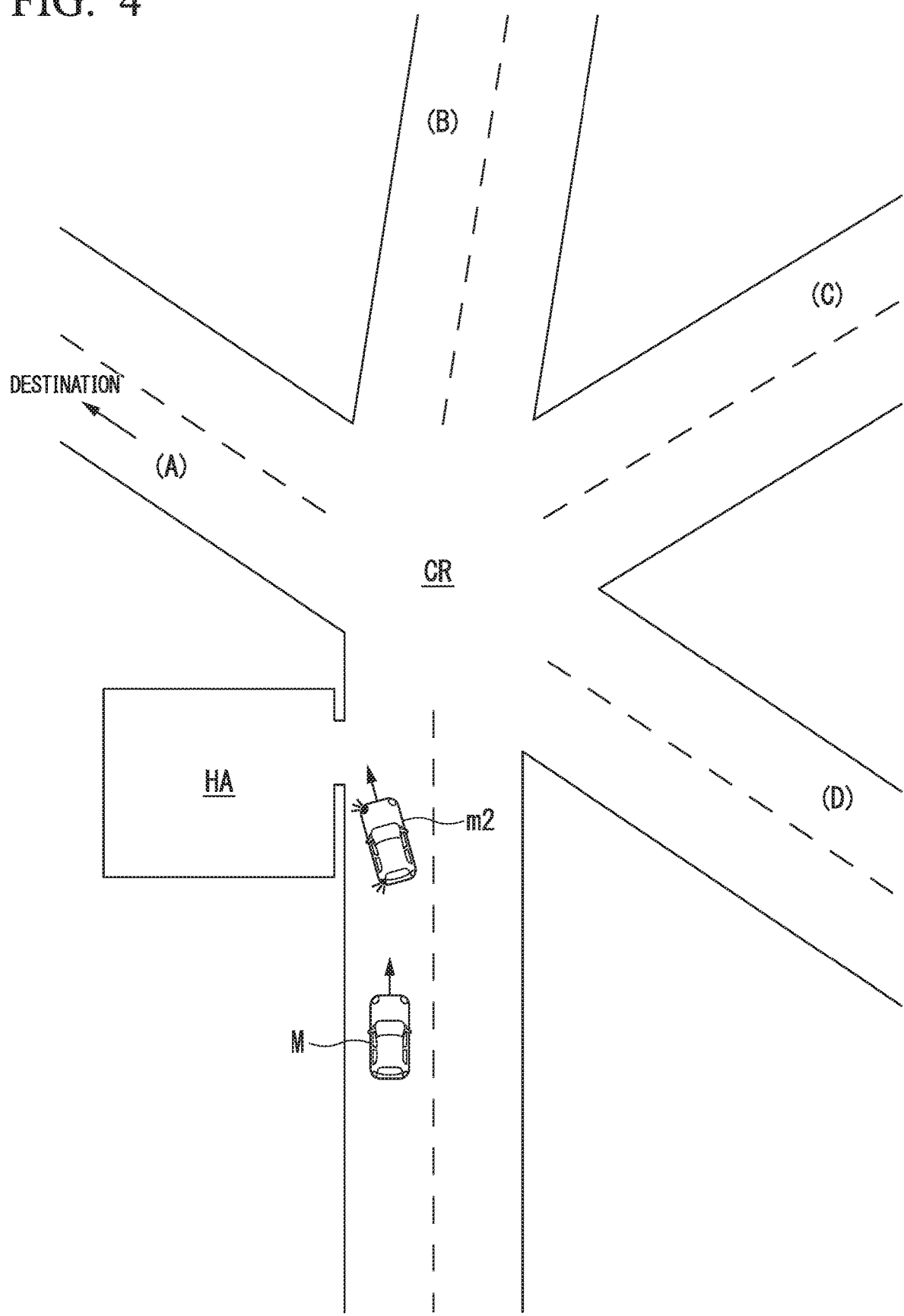
FIG. 4 is a (second) diagram illustrating the function of the following travel controller.

However, the preceding vehicle is not always directed to the destination of the own-vehicle M. FIG. 4 is a (second) diagram illustrating the function of the following travel controller 144. In the illustrated situation, a preceding vehicle m2 is not turning left at the intersection CR but is about to enter an out-of-road area HA near the intersection CR. In such a situation, if the own-vehicle M follows the preceding vehicle m2, the own-vehicle M also enters the out-of-road area HA. Therefore, the following travel controller 144 stops causing the own-vehicle M to travel following the preceding vehicle m2 and leaves the control to the self-passing controller 156.

The function of each functional part will be described in order below. First, the preceding vehicle turning recognizer 132 recognizes the presence or absence of turning, the turning start point, the turning angle, or the like of a preceding vehicle traveling in front of the own-vehicle M. For example, the preceding vehicle turning recognizer 132 recognizes such turning-related situations of the preceding vehicle, for example, on the basis of the inclination of the contour of its vehicle body and the angle of wheels in an image captured by the camera 10 and the distribution of target points detected by the radar device 12 and the finder 14. The preceding vehicle turning recognizer 132 may not only recognize the turning start point of the preceding vehicle on the basis of the actual occurrence of turning as a behavior but may also estimate the turning start point on the basis of the deceleration of the preceding vehicle. For example, the preceding vehicle turning recognizer 132 may predict at which position the speed of the preceding vehicle will become suitable for turning on the basis of the deceleration of the preceding vehicle and recognize (predict) the position at which the speed is suitable for turning as the turning start point. The preceding vehicle turning recognizer 132 may estimate the turning angle on the basis of the lateral acceleration of the preceding vehicle. For example, if the lateral acceleration of the preceding vehicle is great, it is predicted that the preceding vehicle will finally make a sharp turn. Therefore, the preceding vehicle turning recognizer 132 recognizes (predicts) that the turning angle of the preceding vehicle is greater as the lateral acceleration of the preceding vehicle is greater.

The following target specifying unit 146 specifies a preceding vehicle to be followed. For example, the following target specifying unit 146 specifies a vehicle that satisfies both a condition (1) that the vehicle be traveling in front of the own-vehicle M in a state in which there is no other vehicle between the vehicle and the own-vehicle M and a condition (2) that the vehicle activate its turn signal in a direction matching a direction in which the own-vehicle M is scheduled to pass through the intersection CR and/or that the vehicle be turning in a direction matching the scheduled direction as a preceding vehicle to be followed. The "scheduled direction" is a direction, indicated by the on-map route or the recommended lane, in which the own-vehicle is to pass through the intersection CR. "Matching" means that the directions substantially coincide with each other and requires at least that the two vehicles activate the same left or right turn signal or be turning to the same left or right side.

The turning mode predictor 148 predicts a turning start point in a route predicted for the preceding vehicle to be followed to pass through the intersection CR in the scheduled direction. For example, the turning mode predictor 148 performs matching between the second map information 62 and the current position of the own-vehicle M to generate the predicted route on a road shape model based on the second map information 62. Then, the turning mode predictor 148 predicts the turning start point and the turning angle in the predicted route.

Figure 5:
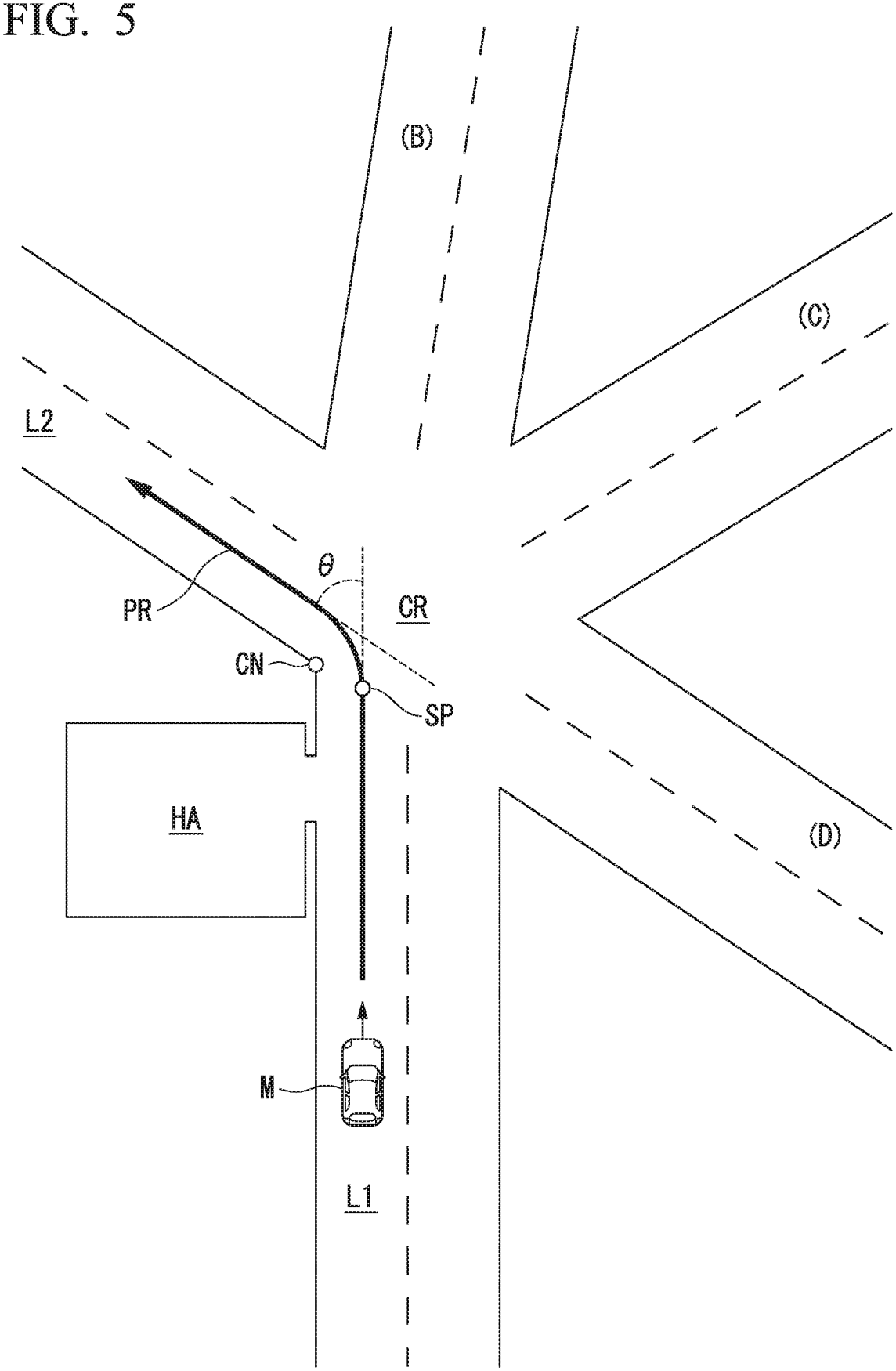
FIG. 5 is a diagram illustrating a predicted route generated by a turning mode predictor.

FIG. 5 is a diagram illustrating the predicted route generated by the turning mode predictor 148. In FIG. 5, PR is a predicted route, SP is a turning start point, and θ is a turning angle. For example, the turning mode predictor 148 virtually sets respective center lines of lanes L1 and L2 and determines a route that connects the center lines with an arc inscribed in both the center lines as the predicted route. Although a plurality of arcs inscribed in both the center lines can be set, the turning mode predictor 148 selects, for example, an arc that is separated a predetermined distance from a corner CN of the road which is located inside the turning circle. Then, the turning mode predictor 148 predicts the connecting point between the center line of the lane L1 and the arc as the turning start point SP and the angle between the center line of the lane L1 and the center line of the lane L2 as the turning angle θ.

The turning match determinator 150 determines whether or not the turning start point of the preceding vehicle recognized by the preceding vehicle turning recognizer 132 matches the turning start point SP in the predicted route. Matching means that the distance between the turning start point of the preceding vehicle and the turning start point SP falls within a predetermined distance range.

The turning match determinator 150 determines whether or not the turning angle of the preceding vehicle recognized by the preceding vehicle turning recognizer 132 matches the turning angle θ in the predicted route. Matching means that the difference between the turning angle of the preceding vehicle and the turning angle θ falls within a predetermined angular range.

When the turning match determinator 150 has determined that at least one of the turning start point and the turning angle does not match that of the turning mode of the preceding vehicle, the following travel controller 144 stops following the preceding vehicle to pass through the intersection.

In the example of FIG. 3, if the preceding vehicle m1 is directed in the direction (A), the turning start point and the turning angle of the preceding vehicle m1 match the turning start point SP and the turning angle θ in the predicted route and therefore the following travel controller 144 continues following the preceding vehicle m1. On the other hand, in the example of FIG. 4, at least the turning start point of the preceding vehicle m2 is significantly behind the turning start point SP in the predicted route and therefore the following travel controller 144 stops following the preceding vehicle m2.

Figure 6:
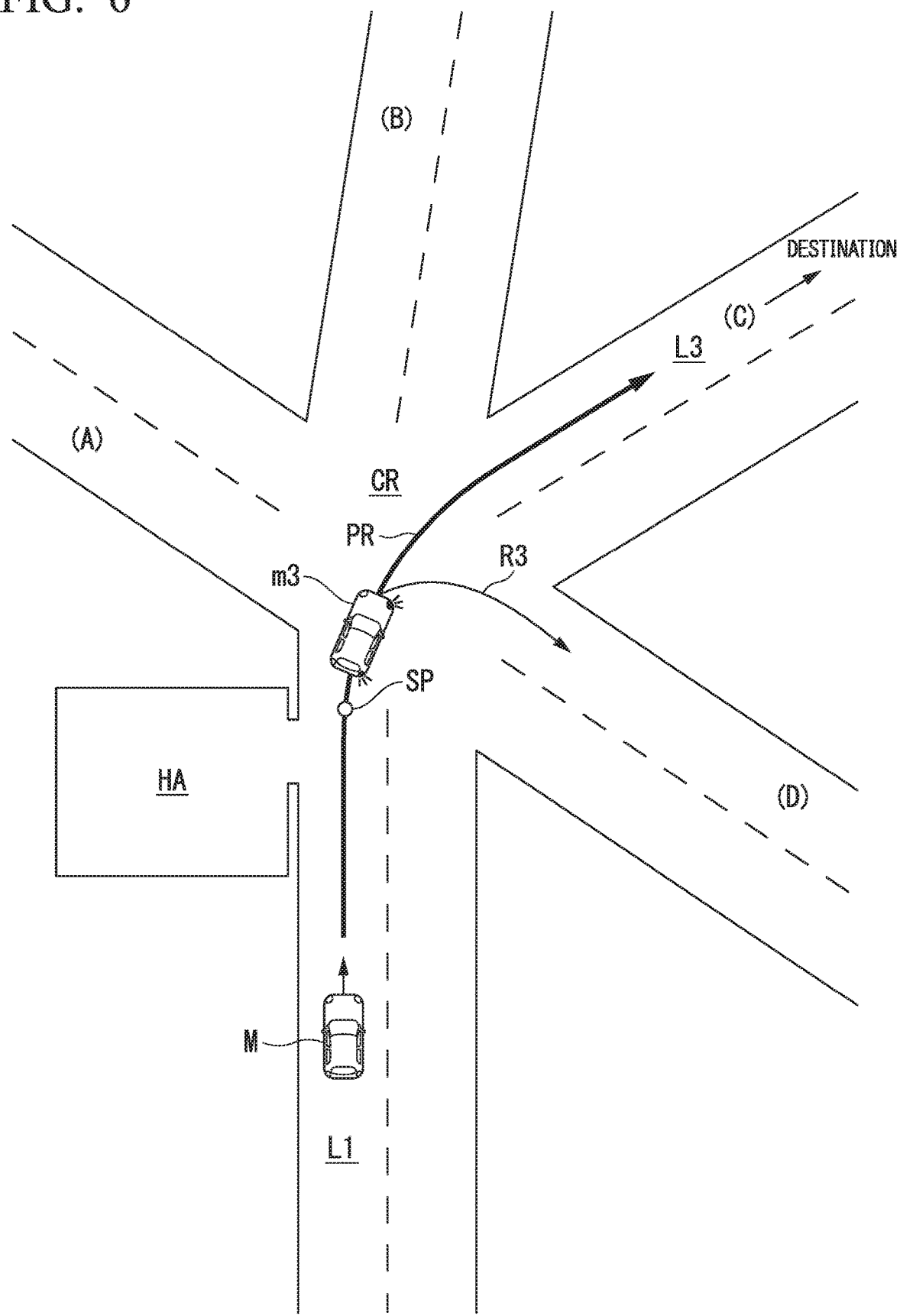
FIG. 6 is a (third) diagram illustrating the function of the following travel controller.

FIG. 6 is a (third) diagram illustrating the function of the following travel controller 144. In the situation shown in FIG. 6, the own-vehicle M is about to proceed toward a direction (C). On the other hand, a preceding vehicle m3 is turning toward a direction (D) instead of toward the direction (C). In such a situation, the turning start point of the preceding vehicle m3 sometimes does not deviate so greatly from the turning start point SP in the predicted route. However, the following travel controller 144 can stop following the preceding vehicle m3 in such a situation since there is a significant difference between the turning angle of the preceding vehicle m3 and the turning angle θ in the predicted route With such a function, even when there is an entry route to the outside of the road near the intersection or when there are a plurality of roads on a right turn or a left turn, it is possible to correctly stop following a preceding vehicle which is not to be followed by the own-vehicle M.

After the own-vehicle M stops following the preceding vehicle or when the own-vehicle M is originally to pass through the intersection without following the preceding vehicle, the self-passing controller 156 is activated to generate a target trajectory for passing through the intersection. The self-passing controller 156 generates the target trajectory of the own-vehicle M, for example, using the same method as when the turning mode predictor 148 generates the predicted route. The self-passing controller 156 performs matching between the arrangement of map-based nearby objects (such as traffic lights, stop lines, and road signs) and the arrangement of actual nearby objects using information acquired through the camera 10 or the like to guarantee the accuracy of the target trajectory.

Figure 7:
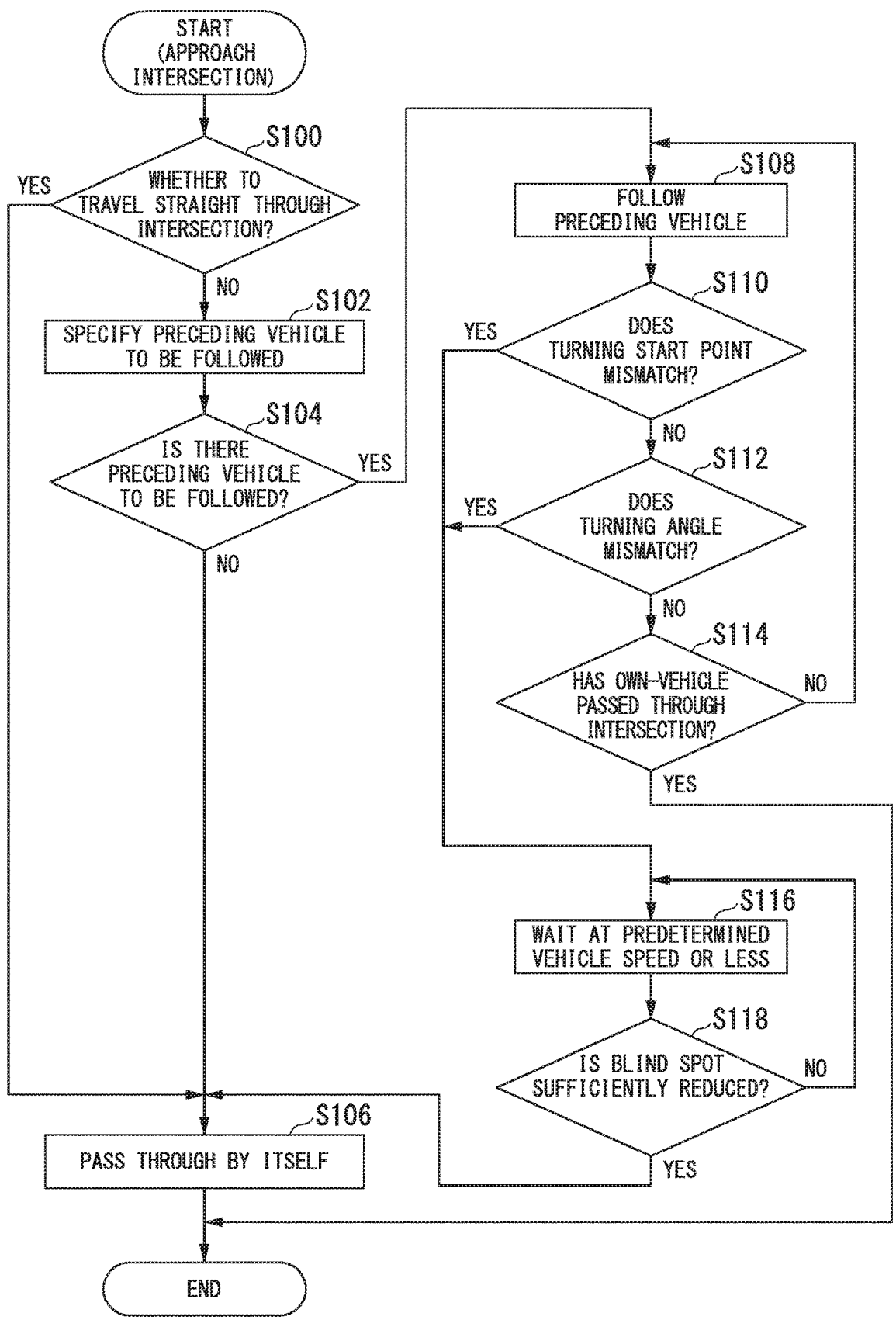
FIG. 7 is a flowchart showing an example of a flow of a process performed by an intersection passing controller.

FIG. 7 is a flowchart showing an example of a flow of a process performed by the intersection passing controller 142. The process of this flowchart is started, for example, when the own-vehicle M approaches an intersection (when the intersection is within a predetermined distance).

First, the intersection passing controller 142 determines whether or not the own-vehicle M is to travel straight through the intersection on the basis of the on-map route or the recommended lane (step S100). When the own-vehicle M is to travel straight through the intersection, the intersection passing controller 142 activates the self-passing controller 156 and generates a target trajectory for passing through the intersection as described above (step S106). The determination process of step S100 may be omitted and the process of this flowchart may be started from step S102. In this case, when a preceding vehicle travels straight through the intersection, the own-vehicle M will also similarly pass through the intersection following the preceding vehicle that travels straight through the intersection.

When the own-vehicle M is not to travel straight through the intersection, the intersection passing controller 142 activates the following travel controller 144 to perform the following processing. First, the following target specifying unit 146 specifies a preceding vehicle to be followed (step S102). The intersection passing controller 142 determines whether or not there is a preceding vehicle to be followed (whether or not a preceding vehicle to be followed has been specified) (step S104). When there is no preceding vehicle to be followed (no preceding vehicle to be followed has been specified), the intersection passing controller 142 advances the process to step S106.

When there is a preceding vehicle to be followed, the following travel controller 144 causes the own-vehicle M to travel following the preceding vehicle (step S108). Next, the turning match determinator 150 determines whether or not the turning start point of the preceding vehicle does not match that of the predicted route generated by the turning mode predictor 148 (step S110).

Upon determining that the turning start point does not match, the intersection passing controller 142 performs waiting at a predetermined vehicle speed or less until a blind spot due to the preceding vehicle is sufficiently reduced (steps S116 and S118). The blind spot due to the preceding vehicle is, for example, quantified by the recognizer 130. For example, the recognizer 130 calculates an area occupied by the preceding vehicle in an image captured by the camera 10, quantifies the blind spot on the basis of the calculated area, and outputs the quantified value to the intersection passing controller 142. The intersection passing controller 142 determines that the blind spot has not been sufficiently reduced when the quantified value of the blind spot input from the recognizer 130 is greater than or equal to a threshold value. Then, the intersection passing controller 142 advances the process to step S116.

When the turning start point matches (or when whether or not it matches is unclear at that point in time), the turning match determinator 150 determines whether or not the turning angle of the preceding vehicle does not match that of the predicted route generated by the turning mode predictor 148 (step S112). When the turning angle does not match, the intersection passing controller 142 advances the process to step S116.

When the turning angle matches (or when whether or not it matches is unclear at that point in time), the intersection passing controller 142 determines whether or not the own-vehicle M has passed through the intersection (step S114). When own-vehicle M has not passed through the intersection, the process returns to step S108, and when the own-vehicle M has passed through the intersection, the process of this flowchart ends.

In the above description, if there is a preceding vehicle to be followed, it is assumed that the own-vehicle M follows the preceding vehicle to pass through the intersection without no other special conditions attached. However, other conditions may be added as described below. For example, (A) the own-vehicle M may follow the preceding vehicle to pass through the intersection only when the shape of the intersection is an irregular shape (not a general cross or T shape). This is because it is particularly difficult for an automatically driven vehicle to determine a turning angle for traveling in a desired direction at an irregular-shaped intersection. (B) The own-vehicle M may follow the preceding vehicle to pass through the intersection only during nighttime or heavy weather. This is because, in such cases, the sensing ability of the camera 10 or the like is lowered compared to daytime or better weather.

In view of the fact that passage through the intersection by automated driving is relatively difficult at an irregular-shaped intersection, the intersection passing controller 142 may increase the inter-vehicle distance from the preceding vehicle before passing through a specific intersection. The specific intersection is an irregular-shaped intersection where a flag is set in the second map information 62 or the like. This reduces a blind spot of sensing due to the preceding vehicle and therefore it is possible to perform passage through the intersection more smoothly.

The automated driving control device 100 of the embodiment described above includes a recognizer (120) configured to recognize a situation occurring near an own-vehicle M; and a driving controller (140, 160) configured to control acceleration/deceleration and steering of the own-vehicle M on the basis of a result of the recognition of the recognizer (120), wherein when performing travel control according to a behavior of a preceding vehicle that is traveling in front of the own-vehicle M such that the own-vehicle M follows the preceding vehicle to pass through an intersection, the driving controller (140, 160) does not perform following of the preceding vehicle if a turning start point of the preceding vehicle does not match a turning start point in a route predicted for the own-vehicle M to pass through the intersection in a scheduled direction or if a turning angle of the preceding vehicle does not match a turning angle in the predicted route, and therefore allows the own-vehicle M to pass through the intersection more smoothly.

[Hardware Configuration]

Figure 8:
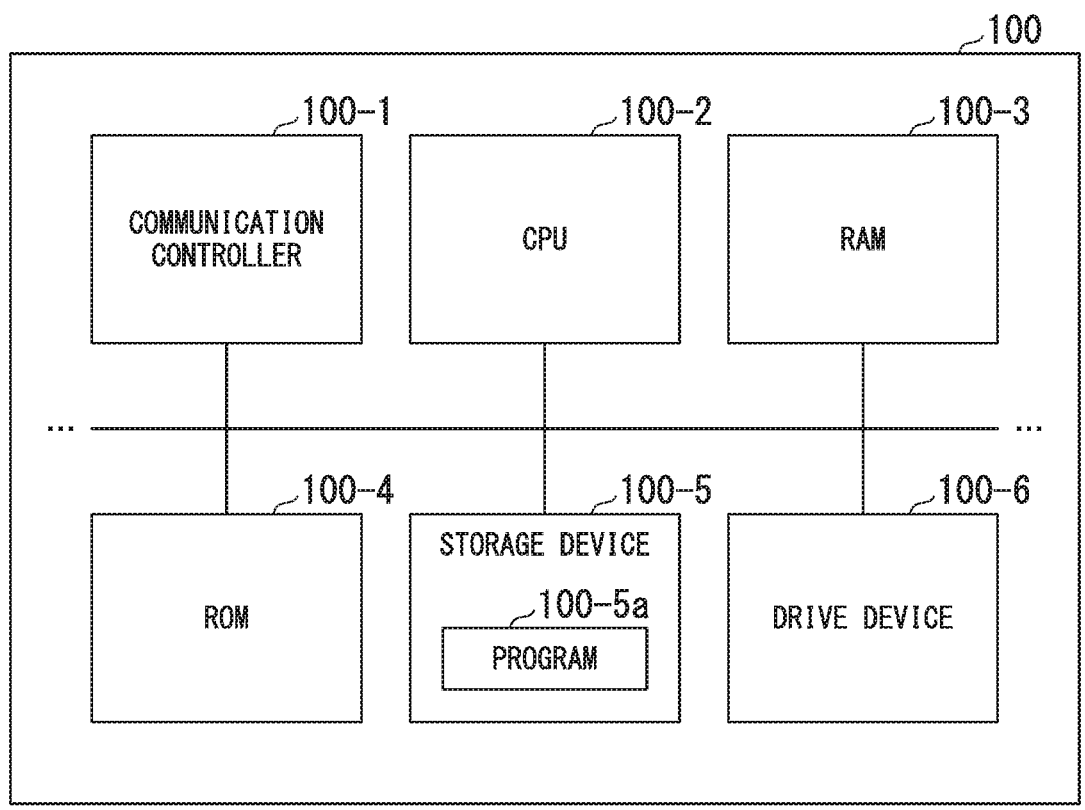
FIG. 8 is a diagram showing an example of a hardware configuration of an automated driving control device according to an embodiment.

FIG. 8 is a diagram showing an example of the hardware configuration of the automated driving control device 100 according to the embodiment. As shown, the automated driving control device 100 is configured such that a communication controller 100-1, a CPU 100-2, a random access memory (RAM) 100-3 used as a working memory, a read only memory (ROM) 100-4 storing a boot program or the like, a storage device 100-5 such as a flash memory or a hard disk drive (HDD), a drive device 100-6, or the like are connected to each other via an internal bus or a dedicated communication line. The communication controller 100-1 performs communication with components other than the automated driving control device 100. The storage device 100-5 stores a program 100-5a to be executed by the CPU 100-2. This program is loaded in the RAM 100-3 by a direct memory access (DMA) controller (not shown) or the like and then executed by the CPU 100-2. Thereby, some or all of the recognizer 130, the behavior plan generator 140, and the second controller 160 are realized.

The embodiments described above can be expressed as follows.

A vehicle control device including:

a storage device configured to store a program; and a hardware processor, wherein, by executing a program stored in the storage device, the hardware processor is caused to:

recognize a situation occurring near an own-vehicle; and control acceleration/deceleration and steering of the own-vehicle on the basis of a result of the recognition, wherein the hardware processor is configured not to, when performing travel control according to a behavior of a preceding vehicle that is traveling in front of the own-vehicle such that the own-vehicle follows the preceding vehicle to pass through an intersection, perform following of the preceding vehicle if a turning start point of the preceding vehicle does not match a turning start point in a route predicted for the own-vehicle to pass through the intersection in a scheduled direction or if a turning angle of the preceding vehicle does not match a turning angle in the predicted route.

Although the modes for carrying out the present invention have been described above by way of embodiments, the present invention is not limited to these embodiments at all and various modifications and substitutions can be made without departing from the gist of the present invention.

What is claimed is:

1. A vehicle control device comprising:
a recognizer component configured to recognize a peripheral environment of an own-vehicle;
a driving controller configured to control acceleration/deceleration and steering of the own-vehicle based on a result of the recognition of the recognizer component, and
a following travel controller comprising a turning mode predictor component configured to virtually set a first center line on a first lane (L1) and a second center line on a second lane (L2), the first lane and the second lane being connected at an intersection, the first lane being a lane in which the own-vehicle travels before turning and the second lane being a lane in which the own-vehicle travels after turning, and determine a route that connects the first center line and the second center line with an arc inscribed in both the first center line and the second center line to generate a predicted route based on the first center line, the second center line, and the route, the predicted route being for the own-vehicle to pass through the intersection in a scheduled direction,
wherein the driving controller is configured not to, when performing following of a preceding vehicle that is traveling in front of the own-vehicle such that the own-vehicle follows the preceding vehicle to pass through the intersection, not perform following of the preceding vehicle when a turning start point of the preceding vehicle does not match a turning start point that is set in the predicted route or when a turning angle of the preceding vehicle does not match a turning angle that is set in the predicted route.

2. The vehicle control device according to claim 1, wherein the driving controller is configured to, when performing following of a preceding vehicle such that the own-vehicle follows the preceding vehicle to pass through the intersection, perform following of the preceding vehicle when the turning start point of the preceding vehicle matches the turning start point that is set in the predicted route or when the turning angle of the preceding vehicle matches the turning angle that is set in the predicted route.

3. The vehicle control device according to claim 1, wherein the driving controller is configured to follow the preceding vehicle to pass through the intersection when a shape of the intersection is an irregular shape, during nighttime, or during weather that decreases recognition of the peripheral environment, and wherein the irregular shape is a shape other than a cross shape or a T shape.

4. The vehicle control device according to claim 1, wherein the following travel controller further comprises:
a following target specifier configured to specify the preceding vehicle that satisfies at least one condition of a group of conditions, the group of conditions comprising:
activating a turn signal in a direction matching a direction in which the own-vehicle is scheduled to pass through the intersection; and
turning in a direction matching the scheduled direction.

5. The vehicle control device according to claim 1, wherein the driving controller is configured to, before passing through a specific intersection, increase an inter-vehicle distance from a preceding vehicle that is traveling in front of the own-vehicle.

6. The vehicle control device according to claim 1, wherein the driving controller is configured to, when not performing following of the preceding vehicle, perform travel control for passing through the intersection on a basis of the result of the recognition of the recognizer component.

7. The vehicle control device according to claim 6, wherein the driving controller is configured to, when not performing following of the preceding vehicle, perform travel control for passing through the intersection on the basis of the result of the recognition of the recognizer component after causing the own-vehicle to wait at a predetermined vehicle speed or less until a blind spot due to the preceding vehicle is reduced.

8. The vehicle control device according to claim 1, wherein the driving controller is configured not to, when performing following of a preceding vehicle such that the own-vehicle follows the preceding vehicle to pass through the intersection, not perform following of the preceding vehicle when an out-of-road area (HA) is present near the intersection, in a width direction of the own-vehicle, and the turning start point of the preceding vehicle does not match the turning start point that is set in the predicted route or when a third lane is connected to the intersection and the turning angle of the preceding vehicle does not match the turning angle that is set in the predicted route.

9. The vehicle control device according to claim 8, wherein the following travel controller further comprises:
a following target specifier configured to specify the preceding vehicle that satisfies at least one condition of a group of conditions, the group of conditions comprising:
activating a turn signal in a direction matching a direction in which the own-vehicle is scheduled to pass through the intersection; and
turning in a direction matching the scheduled direction.

10. The vehicle control device according to claim 8, wherein the driving controller is configured to follow the preceding vehicle to pass through the intersection when a shape of the intersection is an irregular shape, during nighttime, or during heavy weather that decreases recognition of the peripheral environment, and wherein the irregular shape is a shape other than a cross shaped intersection or a T shape intersection.

11. A vehicle control method comprising:
a computer recognizing a peripheral environment of an own-vehicle;
controlling acceleration/deceleration and steering of the own-vehicle based on a result of the recognition; and
virtually setting a first center line on a first lane (L1) and a second center line on a second lane (L2), the first lane and the second lane being connected at an intersection, the first lane being a lane in which the own-vehicle travels before entering the intersection and the second lane being a lane in which the own-vehicle travels after entering the intersection, wherein the virtually setting comprises determining a route that connects the first center line and the second center line with an arc inscribed in both the first center line and the second center line to generate a predicted route based on the first center line, the second center line, and the route, the predicted route being for the own-vehicle to pass through the intersection in a scheduled direction, wherein when performing following of a preceding vehicle that is traveling in front of the own-vehicle such that the own-vehicle follows the preceding vehicle to pass through the intersection, the computer does not perform following of the preceding vehicle when a turning start point of the preceding vehicle does not match a turning start point that is set in the predicted route or when a turning angle of the preceding vehicle does not match a turning angle that is set in the predicted route.

12. A non-transitory computer readable storage medium storing a program causing a computer to:

recognize a peripheral environment of an own-vehicle;

control acceleration/deceleration and steering of the own-vehicle based on a result of the recognition; and virtually setting a first center line on a first lane (L1) and a second center line on a second lane (L2), the first lane and the second lane being connected at an intersection, the first lane being a lane in which the own-vehicle travels before turning and the second lane being a lane in which the own-vehicle travels after turning, wherein the virtually setting comprises determining a route that connects the first center line and the second center line with an arc inscribed in both the first center line and the second center line to generate a predicted route based on the first center line, the second center line, and the route, the predicted route being for the own-vehicle to pass through the intersection in a scheduled direction, wherein when performing following of a preceding vehicle that is traveling in front of the own-vehicle such that the own-vehicle follows the preceding vehicle to pass through the intersection, the computer does not perform following of the preceding vehicle when a turning start point of the preceding vehicle does not match a turning start point that is set in the predicted route or when a turning angle of the preceding vehicle does not match a turning angle that is set in the predicted route.

\* \* \* \* \*